Aug. 11, 1931.  L. J. BUTTOLPH  1,818,687
COLOR FADING CABINET AND FILTER
Filed June 27, 1924   2 Sheets-Sheet 1
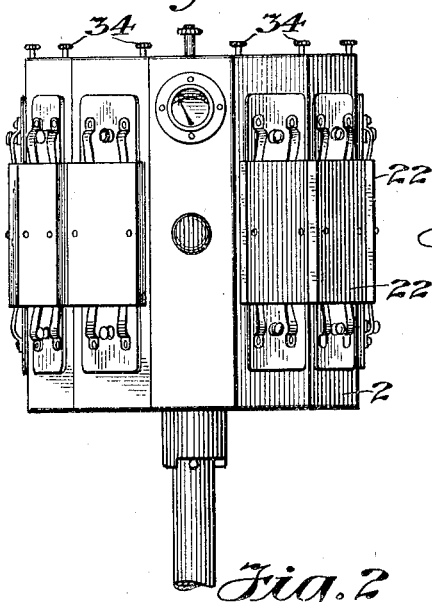
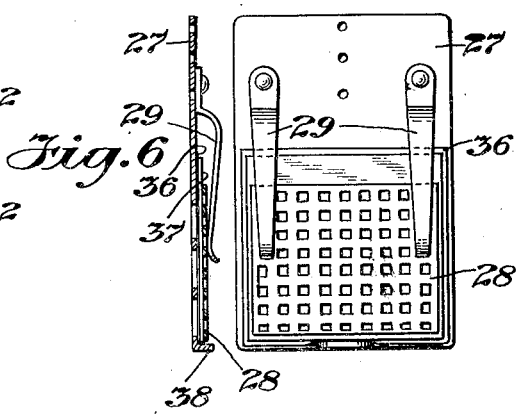
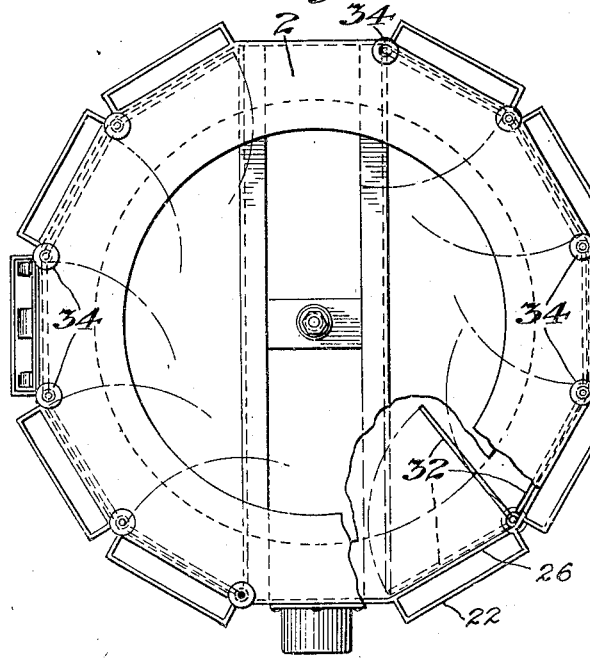
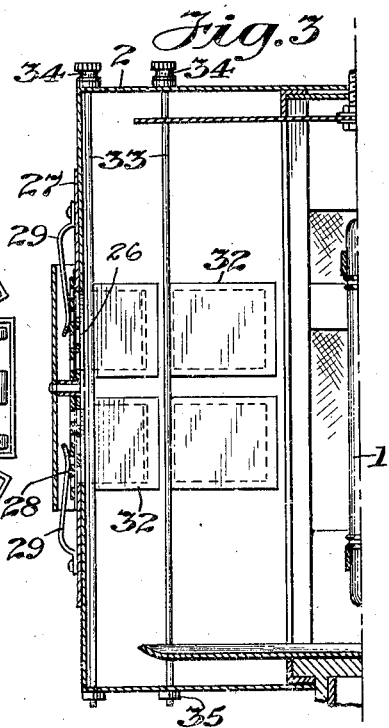
INVENTOR
Leroy J. Buttolph
BY
ATTORNEY Aug. 11, 1931.                L. J. BUTTOLPH                1,818,687
                     COLOR FADING CABINET AND FILTER
                        Filed June 27, 1924        2 Sheets-Sheet 2
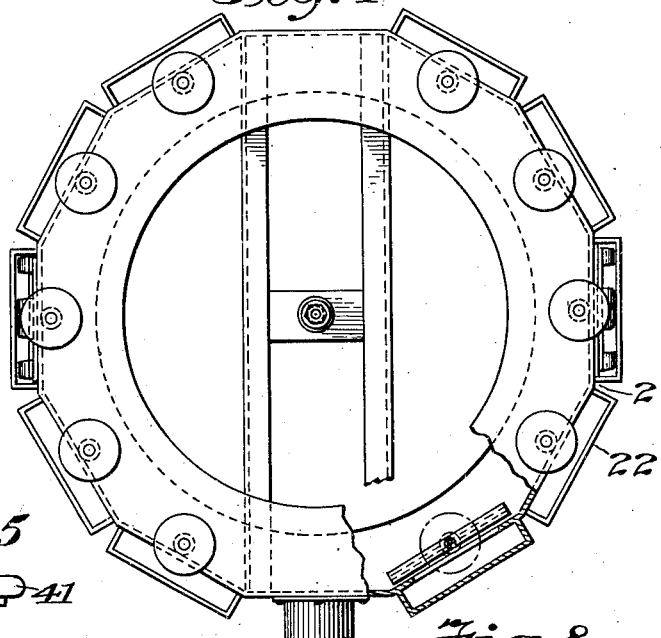
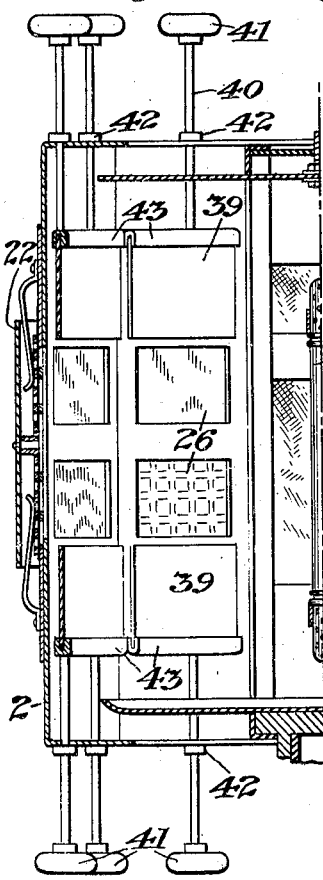
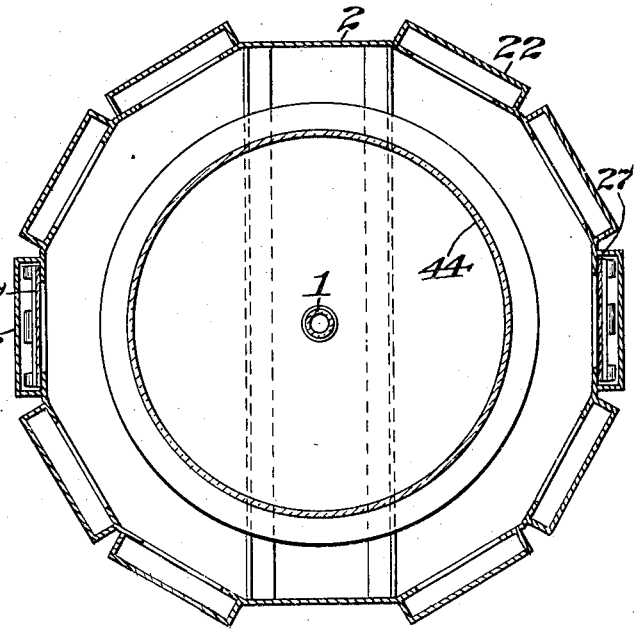
INVENTOR
Leroy J. Buttolph
BY
Thos. H. Brown
HIS ATTORNEY Patented Aug. 11, 1931

1,818,687

UNITED STATES PATENT OFFICE

LEROY J. BUTTOLPH, OF EAST ORANGE, NEW JERSEY, ASSIGNOR TO GENERAL ELECTRIC VAPOR LAMP COMPANY, OF HOBOKEN, NEW JERSEY, A CORPORATION OF NEW JERSEY

COLOR FADING CABINET AND FILTER

Application filed June 27, 1924. Serial No. 722,872.

My present invention relates to means for subjecting colored articles to the influence of light for the purpose of quickly determining what the life of the colors will be under the influence of sun light or other light, or for comparing the lives of different colors. It further relates to apparatus for subjecting such colored articles to artificial light of substantially the same range of wave-lengths as those of sun light which predominate in causing the fading or the changing of colors under its inflence, but of considerably greater effective intensity. It further relates to means for transmitting such artificial light of substantially the same range of wave-lengths as those of sun light which predominate in causing the fading or the changing of colors under its influence, but of considerably greater effective intensity. It further relates to means for transmitting such artificial light and for affecting such light to produce substantially the same range of wave-lengths as those of sun light which effect the fading and changing of colors and in the same relative intensities in which they occur in sun light.

In the fading and changing of colors by sunlight or by artificial light I have found that violet and near ultra-violet light of wave-lengths of from 4,000 to 2,800 Ångstrom units cause substantially all of the fading or changing of colors and that light of these wave-lengths from a fused quartz mercury arc lamp fade or change colors with a greater speed than does sun light. I also find that taking the sun light as a standard, more nearly constant results can be produced under different conditions of humidity, temperature and so on, than can be produced with sun light.

But I also find that the energy distribution of the different wave-lengths of light from artificial sources is not equal throughout the range from the red to the ultra-violet. I also find that certain wave-lengths do not affect colors to fade or change them but are absorbed in the articles being subjected to them and transformed into heat therein.

I have further found that by using filters of glass, gelatine, and the like I can absorb all those wave-lengths but those desired for the fading or changing of colors. I have also found that about 10% of the energy from the light source is reflected by the filters used and that when the filter is relatively near to the source of light that considerable time elapses before the dissipation of this reflected energy which never ultimately reaches the work. I have found, however, that by placing the light filter away from the light source that this energy is much more easily absorbed by the air therebetween.

Therefore, it is the object of my invention to provide means for absorbing such light as is not effective in fading or changing of colors and which will transmit only light for example of the wave-length of violet and near ultra-violet, and to absorb even the far ultra-violet.

It is another object of my invention to provide means for absorbing certain proportions of the light used for the fading or changing of the colors to bring the relative intensities of the wave-length so used to the same as in those parts of sun light effective in such fading or changing of the colors.

It is a further object of my invention to provide means for absorbing such wave-lengths as are not effective in fading or changing colors but which are absorbed by the articles subjected to them and are changed into heat therein.

It is a further object of my invention to provide means for testing the fading and changing of colors by artificial light with the sun light as a standard in which the filters used therein are as far away as possible from the light source.

In the accompanying drawings which form part of this application I have shown embodiments of my invention having the above mentioned characteristics. In these drawings Fig. 1 is an elevation view of a fading cabinet embodying my invention, Fig. 2 is a plan view in part cut away showing this embodiment of my invention, Fig. 3 is a sectional elevation view in part showing the interior of the cabinet of Figure 1, Fig. 4 is a plan view showing another embodiment of my invention, Fig. 5 is a sectional elevation view in part showing the interior of the cabinet in Figure 4, Fig. 6 is a sectional elevational view of a sample holding means for the cabinet of my invention between which and the sample therein is interposed a sheet of filter material, Fig. 7 is a plan view of the holder of Figure 6, showing such filter and Fig. 8 is a plan view of a third embodiment of my invention.

In Figs. 1 to 3 is shown a color fade testing cabinet of my invention which forms the subject of my pending application, Serial Number 665,247, filed September 27th, 1923, issued Oct. 27, 1925 as Patent No. 1,558,786, and to which reference is hereby made. In this cabinet the fused quartz mercury arc lamp 1 is used as the source of light in the multi-sided cabinet 2 in the sides of which the apertures 26 serve for holding and exposing the articles treated to such light. Between the apertures and the source of light are mounted the pivoted screens or filters 32. These filters are mounted on rods 33 which pass through the ends of the cabinet and are pivotally held thereby. These filters are substantially of the same width and length as the aperture before which they are registered, being of such dimensions as to shield such apertures entirely from said source. On the upper ends of the rods 33 are the knobs 34 which serve for turning said rods to move the filters in or out of registration with the openings 26. When it is desired to use the light without these filters the filters are turned and positioned radially with respect to the light source and the cabinet. When in this position the filters are entirely out of the way between the light source and the exposure openings but are easily and quickly movable to be positioned before the openings. By removing knob 34 and nut 35 from the rod 33 the rod and filters can be quickly removed through the opening in the top of the casing 2 and other filters of such different characteristics as desired are quickly replaceable therefor.

Should it be desired to modify the effect of filters 32 a sheet 36 of other filter material is interposed in sample holder 27 of Figs. 6 and 7 between the sample 37 and the sample holding grid 28, the springs 29 and the upturned edge 38 of holder 27 serving to hold the filter, sample and grid in the desired position. And in some cases I use a filter sheet held in holder 27, as described, as the only means of conditioning the light to the sample, the filter 32 at such times being turned out of registration to the exposure opening. For some purposes I use the sheet filter of Figs. 6 and 7 in conjunction with filter 32.

In Figs. 4 and 5 is shown another form of the application of my invention in which the filters 39 are held by the sliding rods 40 which pass through the ends of the cabinet and are frictionally engaged by bosses 42 through which they pass and are movable therein to bring the filters 39 in or out of registration with openings 26. Sufficient space is provided between the openings 26 and the ends of the cabinet to completely remove the filters from registration with their respective openings. In some forms of this apparatus I make all those filter clamps 43 which are at one end of the cabinet unitary to form a frame whereby all the filters at one end of the cabinet can be moved into or out of registration with their respective exposure openings 26 simultaneously.

In Fig. 8 is shown another embodiment of my invention in which the cylinder 44 of filter material is mounted at a substantial distance about the light 1. The material of cylinder 44 is preferably of colored glass or of glass having a coating of the desired light filtering qualities. The cylinder for some purposes is made in sections of different light filtering qualities which sections serve to pass lights of different wave-lengths to different samples exposed thereto severally, whereby different fading effects can when desired be determined at the same time with the same lamp. Likewise to serve under different conditions to produce different fading effects the cylinder 44 is made in different sizes whereby the size of the spaces between it and the exposed sample and between it and the light source can be changed to suit conditions of testing and in accordance with desired effects.

In controlling the dissipation of the ordinary radiant heat, which is always found to be a problem in the use of an artificial light source for such testing of color fading, I find that the position of the filter is an important factor. Thus, if the filter is of such a nature as to completely enclose the light source at a distance of one tenth the distance from the light source to the material under test, some five to ten per cent of radiant energy which would otherwise be reflected back from the first surface of the filter medium has no opportunity to escape from the space enclosed by the filter itself and is thus of necessity finally absorbed by the filter and re-radiated as heat. If, on the other end, the filter is placed at a greater distance than this from the light source, there is opportunity through the absorption of air for a more complete dissipation of the reflected energy. If furthermore the filter is placed in direct contact with the material under test, the resulting reflected air circulation produces an abnormal fading condition. And I find that very good results are secured by placing the filter media greater than one thirty-second of an inch from the material under test and greater than one tenth of the distance from the light source to the material under test from the source itself. As a further reason for placing the filter at a distance as above noted from the source I find that many filter media are unstable when unduly heated, and as a result cause non-uniform effects.

I claim:

1. In a color fading and testing apparatus, in combination, a source of light, means for holding color samples for exposure to said source, and light filtering means carried by said holding means and positioned between the sample and the said light source adapted to stop rays capable of producing heat at the sample.

2. In combination in a color fading and testing apparatus, a source of light, a casing about said light, color sample holding means mounted over openings in said casing, light filtering means interposed between said casing and said source, and light filtering means carried by said sample holding means interposed between the sample and said source.

3. In combination in a color fading and testing apparatus, a source of light, a casing about said light, color sample holding means mounted over openings in said casing, and light filtering means carried by said sample holding means interposed between the sample and said source.

4. In combination in a color fading and testing apparatus, a source of light, a casing about said light, color sample holding means mounted over openings in said casing, and light filtering means interposed between said casing and said source and pivotally mounted near the casing wall and rotatable on said mounting to register over said openings or to be aligned radially with respect to the source and the casing.

5. In combination in a color fading and testing apparatus, a source of light, a casing about said light, color sample holding means mounted over openings in said casing, spindles rotatably mounted on said casing and passing near the edges of said opening, and light filtering means mounted on said spindles.

6. In combination in a color fading and testing apparatus, a source of light, a casing about said light, color sample holding means mounted over openings in said casing, light filtering means mounted within said casing between the openings therein and the ends of said casing, and means for moving said light filtering means into registry with said openings.

7. In a color fading and testing apparatus, in combination, a source of light, means for holding a color sample for exposure to light from said source, and a filter between said light source and a sample held by said means, whereby only selected radiations from said source are permitted to reach said sample.

8. In a color fading and testing apparatus, in combination, a source of light, means for holding a color sample for exposure to light from said source, and a filter between said light source and a sample held by said means, said filter being permeable to rays capable of fading said sample of wave lengths longer than 2800 Ångstrom units, but substantially impermeable to rays of shorter wave lengths.

9. In a color fading and testing apparatus, in combination, a source of light, means for holding a color sample for exposure to light from said source, and a filter between said light source and a sample held by said means, said filter being permeable to radiations having wave lengths between 4000 and 2800 Ångstrom units, but substantially impermeable to radiations of shorter wave lengths.

Signed at Hoboken in the county of Hudson and State of New Jersey this 27th day of June, 1924 A. D.

LEROY J. BUTTOLPH.